United States Patent [19]
Thompson et al.

[11] 3,964,103
[45] June 15, 1976

[54] MAGNETIC TRANSDUCER WITH TRIM ERASE AND HOUSING THEREFOR

[75] Inventors: Herbert E. Thompson; David A. Brown, both of Los Gatos, Calif.

[73] Assignee: Shugart Associates, Inc., Sunnyvale, Calif.

[22] Filed: May 19, 1975

[21] Appl. No.: 578,649

[52] U.S. Cl. .................................. 360/129; 29/603; 360/118; 360/121
[51] Int. Cl.² ..................... G11B 5/105; G11B 5/27; G11B 5/42
[58] Field of Search ............. 360/118, 103, 99, 129, 360/121, 122

[56] References Cited
UNITED STATES PATENTS

| | | |
|---|---|---|
| 3,268,877 | 8/1966 | Hagen .................................. 360/103 |
| 3,485,958 | 12/1969 | Bos et al. ............................. 360/118 |
| 3,670,112 | 6/1972 | Ruszczyk et al. ..................... 360/103 |
| 3,838,462 | 9/1974 | Barbeau et al. ........................ 360/99 |

*Primary Examiner*—Robert S. Topper
*Attorney, Agent, or Firm*—Boone, Schatzel & Hamrick

[57] ABSTRACT

A magnetic head assembly and the method of manufacture therefor comprising a generally cylindrical housing having a tapered portion at one end thereof terminating in a circular aperture having an inner diameter, a circular slider body having an outer diameter slightly less than the inner diameter, a media engaging surface and an internal surface and being disposed within the circular aperture and affixed to the housing. The body also includes a first elongated slot disposed along a first diameter and extending through the body, a second slot disposed along a second diameter normal to the first diameter and extending into the body from the internal surface, and a central aperture extending through the body at the intersection of the first and second slots. A read/write transducer has a pair of read/write pole pieces which are separated to provide a read/write gap and which extend into the first slot with the read/write gap positioned with the central aperture. An erase transducer including a pair of erase pole pieces is disposed in the second slot with one-pole piece on each side of the first slot. The ends of the erase pole pieces nearest the read/write pole piece extend into the central aperture and are separated from the read/write pde pieces to form first and second erase gaps.

7 Claims, 11 Drawing Figures

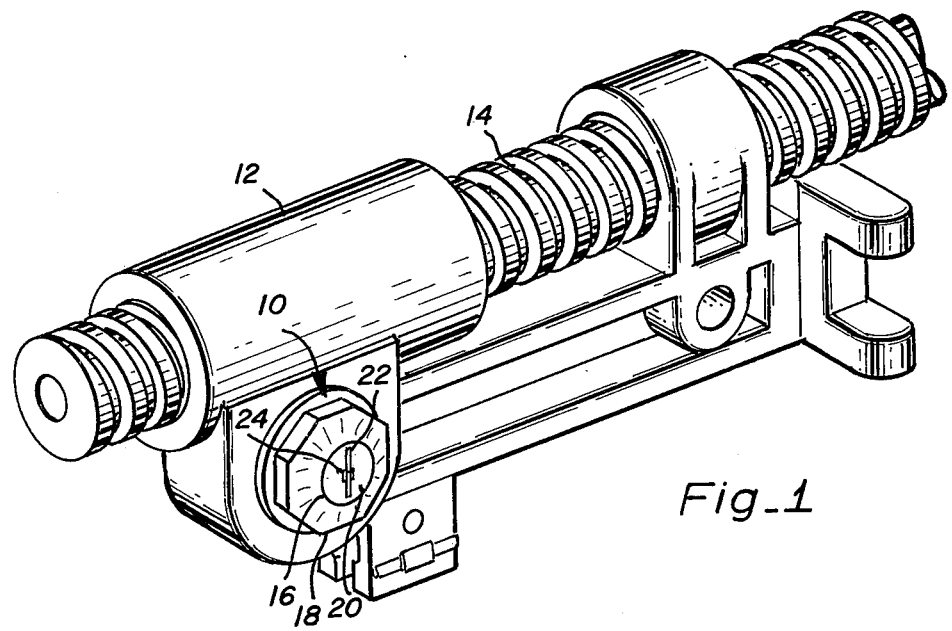
Fig_1
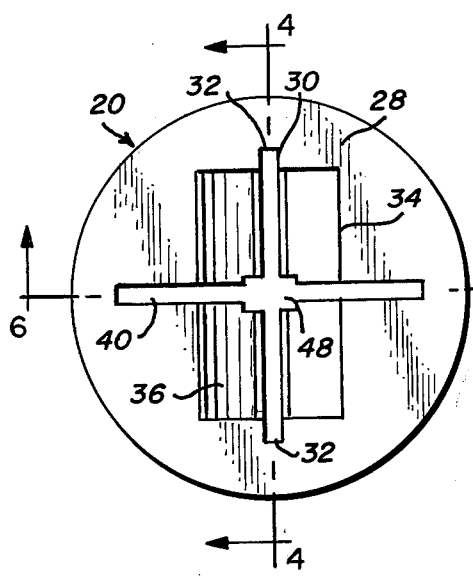
Fig_3
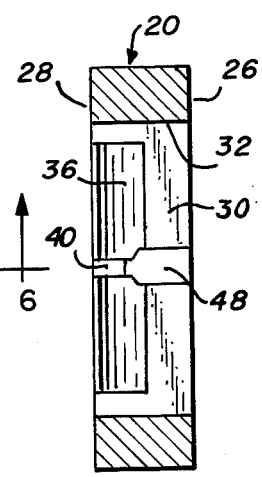
Fig_4
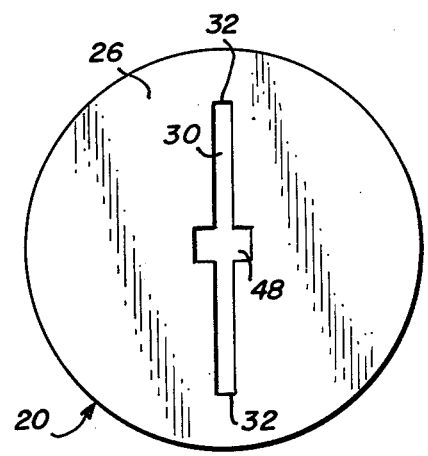
Fig_5
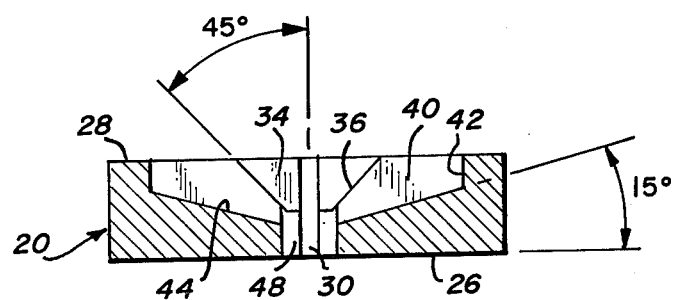
Fig_6

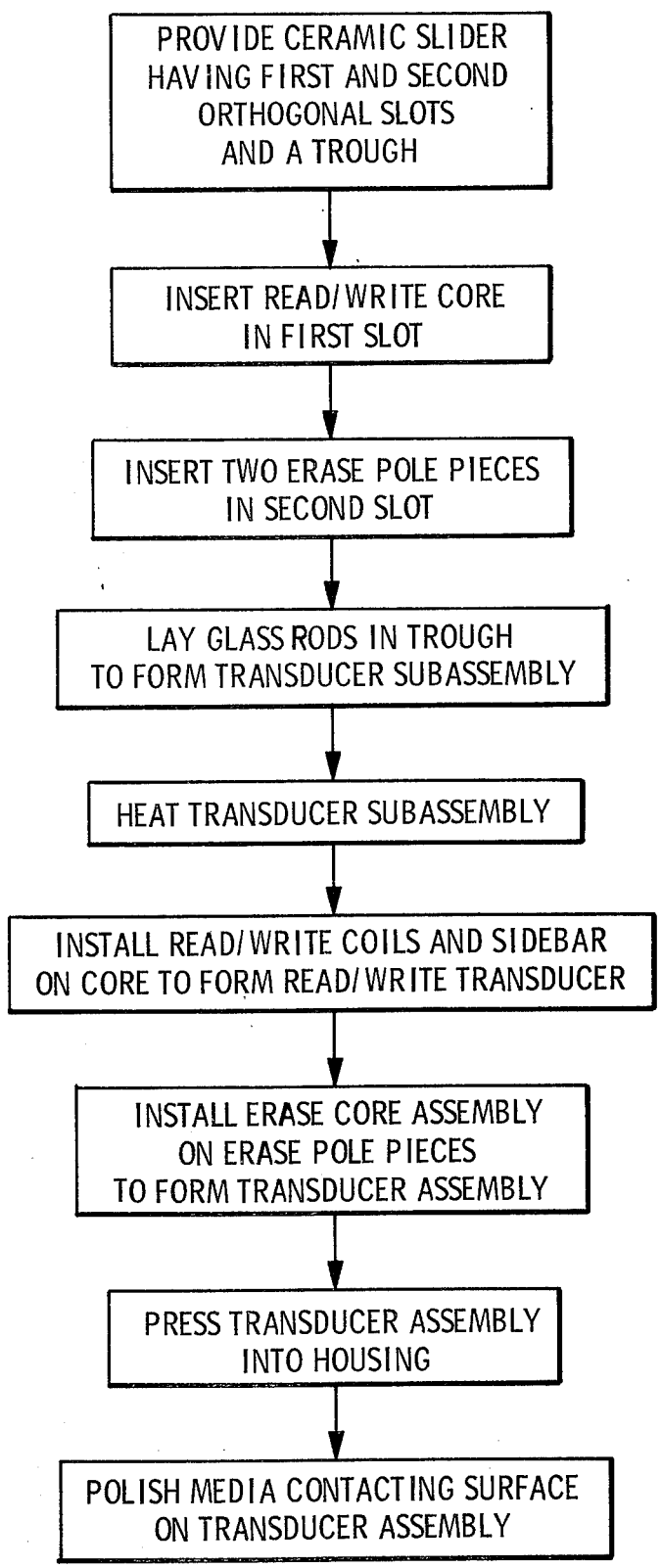
Fig_2

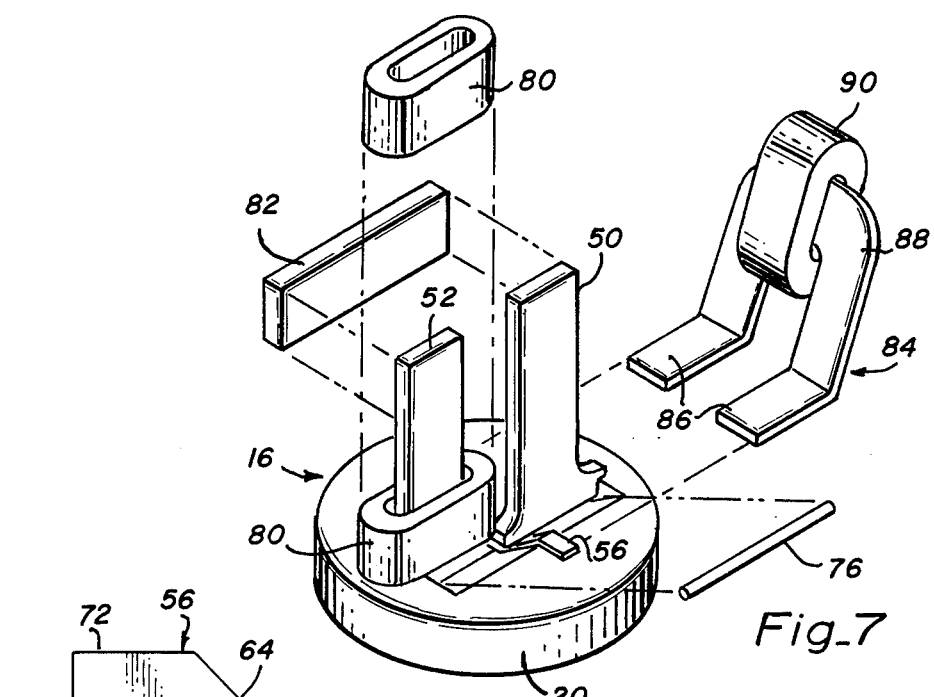
Fig_7
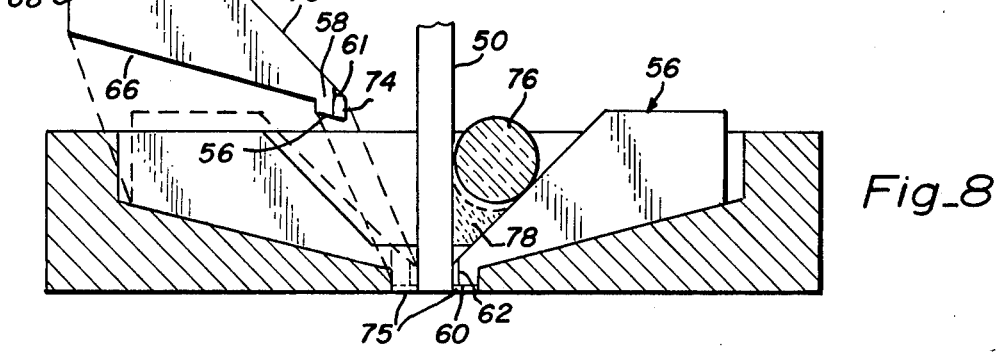
Fig_8
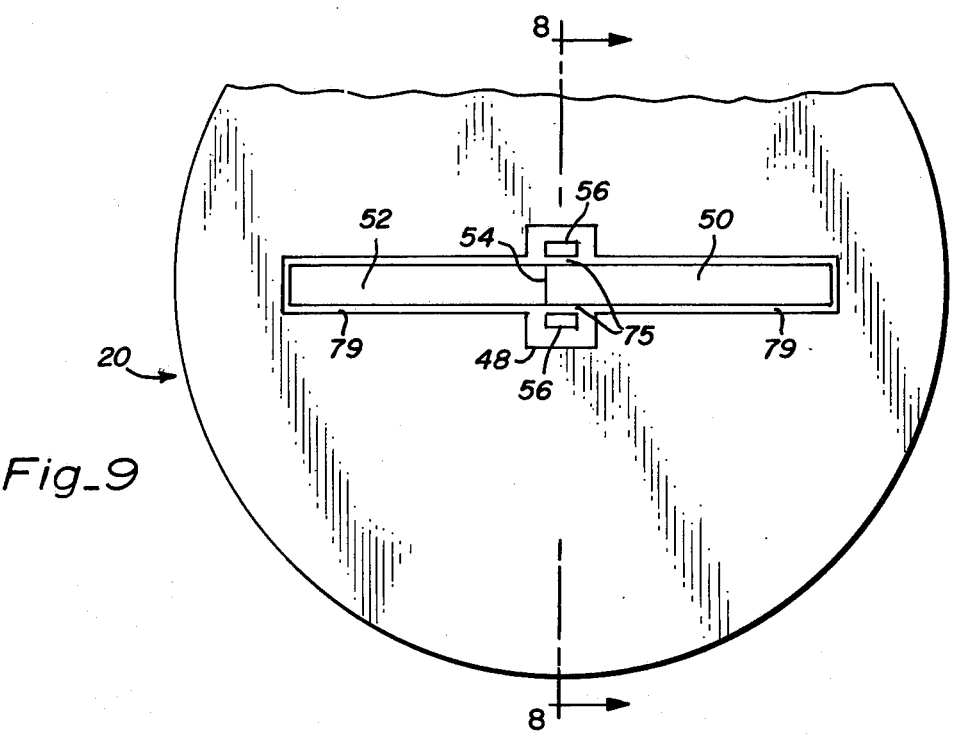
Fig_9

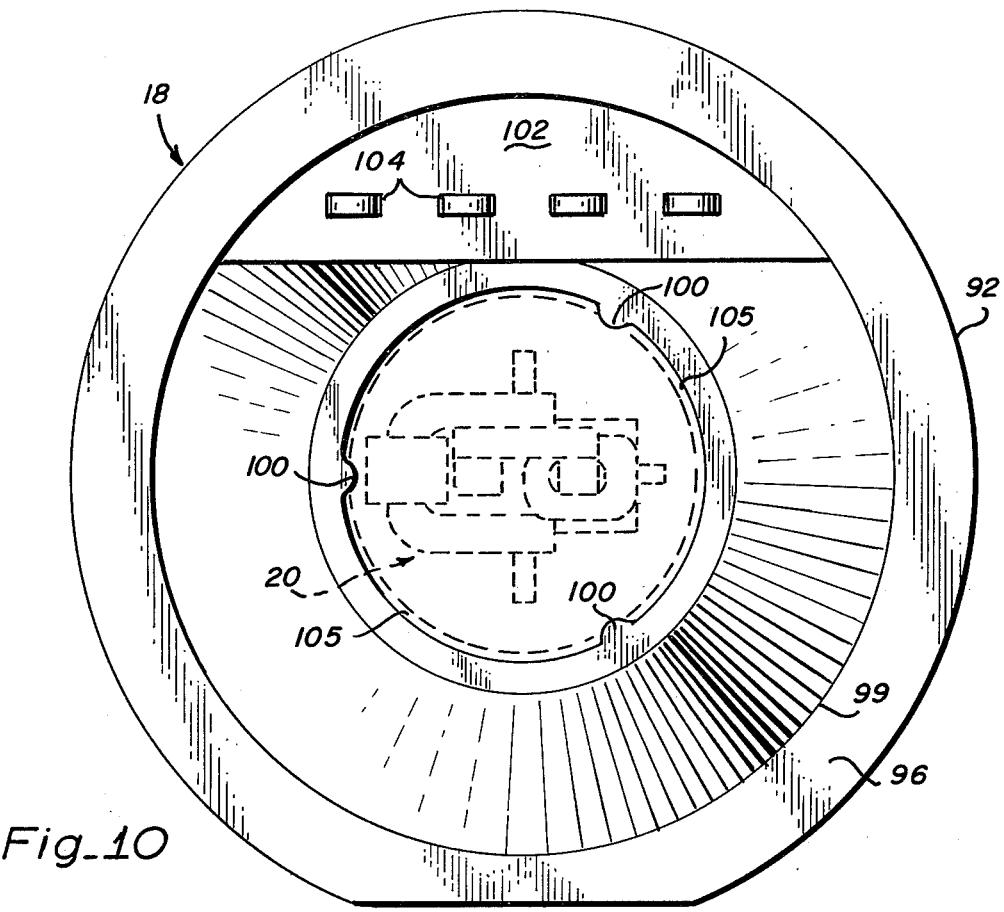
Fig_10
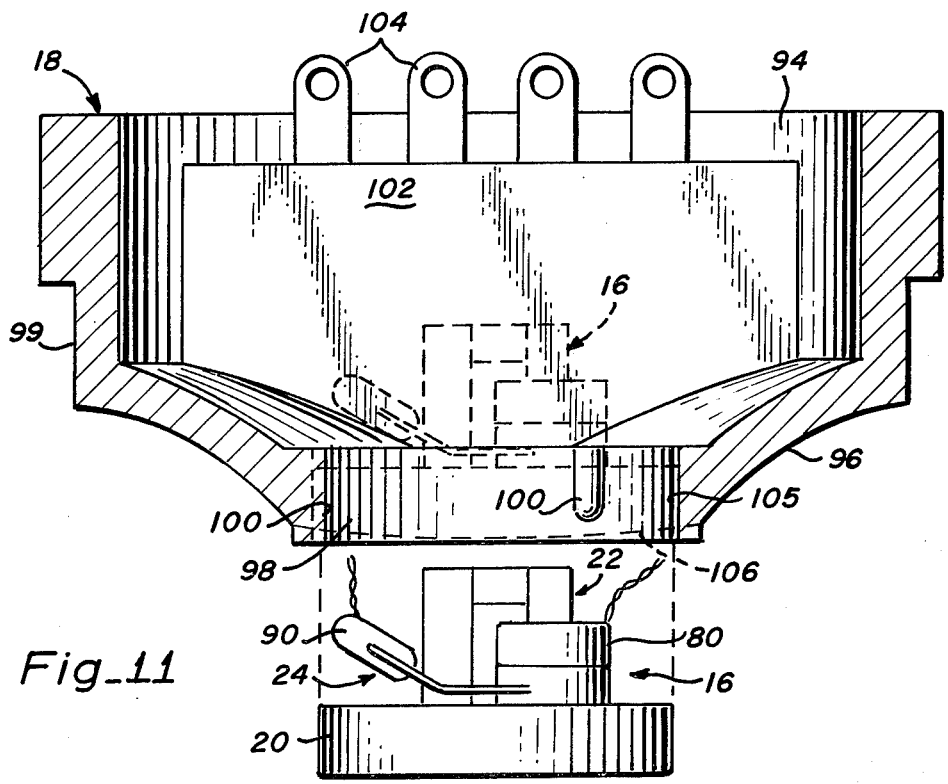
Fig_11

MAGNETIC TRANSDUCER WITH TRIM ERASE AND HOUSING THEREFOR

BACKGROUND OF THE INVENTION

1. Field of the Invention

This invention relates generally to magnetic head assemblies and methods of manufacture therefor and, more particularly, to magnetic head assemblies having a magnetic read/write transducer and a pair of erase transducers.

2. Description of the Prior Art

Magnetic head assemblies have long been used for recording and reproducing bits of information on relatively moving magnetic mediums, such as magnetic discs, magnetic drums and magnetic tape. Magnetic discs may be either rigid or flexible. The rigid disc includes an aluminum disc-shaped substrate which is coated with a magnetizable material and which rotates at high speeds under a magnetic head assembly, thereby forming memory tracks arranged in a series of concentric circles about the center of the disc. In applications which require high data transfer rates, noncontact recording schemes have been used so as to avoid the wear problems associated with contact recording. In noncontact recording schemes, the magnetic heads are supported by a self-acting air bearing created between the head and the disc during relative rotation therebetween with the air bearing surface being designed to insure that the spacing is relatively constant. These flying heads are expensive to fabricate since extremely precise machining of the air bearing surface of the slider body is required in order to obtain the exact aerodynamic characteristics. Severe problems have also been encountered in positioning and bonding a magnetic transducer within the slider body.

In flexible disc systems, the magnetic medium comprises a flexible mylar substrate having magnetic material secured thereto to provide the recording surfaces. In recording and reproducing information in these systems, the magnetic read/write transducers contact the recording surface. To limit the width of the track written by the read/write transducers, the magnetic head includes erase transducers positioned on both sides of the read/write transducer which serve to erase the edges of the track immediately after it is written. Compliance between the transducers and the flexible medium is affected by utilizing pressure pads which continuously conform the disc against the contour of the transducing surface of the head assembly.

Heretofore, the magnetic head assemblies used in flexible disc drive systems have incorporated much of the technology developed for flying heads. For example, the head assembly has included separate erase transducers positioned adjacent the read/write transducer and having their gaps aligned parallel to and spaced apart from the gap of the read/write core to avoid cross coupling between the read/write and the erase transducers. In addition, the transducers have been bonded to the head assembly with epoxy. In epoxying the magnetic transducer components into the head assembly, many steps are involved and elaborate fixtures are required to hold the components in place during assembly. Because of the labor and fixturing involved, the assembly process is very expensive. In addition to the expense involved, another disadvantage is that because the erase gaps are spaced apart from the read/write gap to avoid cross coupling, circuits are required to delay the energization of the erase transducer relative to the energization of the read/write transducer. Also, because the erase gaps are parallel to the read/write gap, the read/write track cannot be easily trimmed to a width less than the width of the read/write core.

SUMMARY OF THE PRESENT INVENTION

It is therefore a primary object of the present invention to provide a magnetic head assembly which is simple in structure, inexpensive to fabricate, and which provides trim erase at the read/write gap.

Still another object of the present invention is to provide a process for fabricating magnetic head assemblies which utilize self-fixturing to reduce labor costs and in which a slider is press fit into a housing.

Briefly, a preferred embodiment of the invention includes a generally cylindrical housing having a tapered portion at one end thereof terminating in a circular aperture having an inner diameter, a circular body forming a slider having an outer diameter slightly less than the inner diameter, a media engaging surface and an internal surface, the body further having a first elongated slot disposed along a first diameter and extending through the body, a second slot disposed along a second diameter normal to the first diameter and extending into the body from the internal surface, and a central aperture extending through the body at the intersection of the first and second slots, the body being disposed within the circular aperture and affixed to the housing, a read/write transducer having a pair of read/write pole pieces separated to provide a read/write gap, the read/write pole pieces extending into the first slot with the read/write gap positioned within the central aperture, and an erase transducer including a pair of erase pole pieces disposed in the second slot, one on each side of the first slot, the ends of the erase pole pieces nearest the read/write pole piece extending into the central aperture and being separated from the read/write pole pieces to form first and second erase gaps.

In another embodiment of the invention, a method for manufacturing a magnetic head assembly includes the steps of providing a slider including a circular body having an outer diameter, a media engaging surface and an internal surface, the body further having a first elongated slot disposed along a first diameter and extending through the body, a second slot disposed along a second diameter normal to the first diameter and extending into the body from the internal surface, and a central aperture extending through the body at the intersection of the first and second slots, inserting a read/write core having a pair of read/write pole pieces separated to provide a read/write gap into the first slot with the read/write gap positioned within the central aperture, inserting a pair of erase pole pieces into the second slot, one on each side of the read/write core with the ends of the erase pole pieces nearest the read/write gap extending into the central aperture and being separated from the read/write core to form first and second erase gaps, placing a glass rod on and near the end of each pole piece, heating the glass rod to its melting temperature such that glass flows into the central aperture and into the spaces between the read/write pole pieces and the erase pole pieces, installing read/write coils and a sidebar on the read/write core to form a read/write transducer, and installing an erase core assembly on the erase pole pieces to form an erase transducer. Thereafter, the slider is pressed into a plastic housing.

The principal advantage of the present invention is that it is fabricated with a self-fixturing process that provides substantial cost reduction.

Another advantage of the present invention is that it provides trim erase at the read/write gap.

Still another advantage of the present invention is that the geometry of the slider face provides a continuous surface which is easily machined.

These and other objects and advantages of the present invention will no doubt become apparent to those of ordinary skill in the art after having read the following detailed description of the preferred embodiments which are illustrated in the several figures of the drawings.

IN THE DRAWINGS

FIG. 1 is a perspective view of a magnetic head assembly in accordance with this invention mounted in a carriage carried by a lead screw;

FIG. 2 is a block diagram pointing out the principal operative steps involved in fabricating a magnetic head assembly in accordance with the present invention;

FIG. 3 is a top plan view of a slider formed in accordance with this invention;

FIG. 4 is a cross-sectional view taken along the line 4—4 of FIG. 3;

FIG. 5 is a bottom plan view of the slider shown in FIG. 3;

FIG. 6 is a cross-sectional view taken along the lines 6—6 of FIG. 3;

FIG. 7 is a partially-exploded perspective view of a transducer assembly illustrating the steps of installing a read/write coil, a sidebar, and an erase core assembly.

FIG. 8 is a cross-sectional view illustrating a read/write core, a pair of erase pole pieces, and a glass rod inserted in the slider;

FIG. 9 is a bottom plan view of a portion of the transducer assembly of FIG. 8 after a glassing operation illustrating the fringing flux pattern produced by the erase pole pieces;

FIG. 10 is a plan view of a housing for receiving the transducer assembly of FIG. 9; and FIG. 11 is a cross-sectional view taken along the line 11—11 of FIG. 10 illustrating the transducer assembly prior to insertion.

DETAILED DESCRIPTION OF THE PREFERRED EMBODIMENT

Referring now to FIG. 1 of the drawing, a magnetic head assembly 10, in accordance with the present invention is shown mounted to a carriage 12. The carriage 12 is driven by a lead screw 14 in such a manner as to enable the assembly to radially access a selected one of a plurality of circumferential tracks on a flexible magnetic medium (not shown). The assembly 10 comprises a transducer assembly 16 mounted in a housing 18. The transducer assembly 16 includes a slider 20, an electromagnetic read/write transducer 22 and an electromagnetic erase transducer 24.

A block diagram pointing out the principal operative steps involved in fabricating the magnetic head assembly 10 is illustrated in FIG. 2.

The slider 20 is illustrated in FIGS. 3–6 and includes a disc formed of a nonmagnetic material which has a coefficient of thermal expansion substantially equal to that of the magnetic material forming the transducers 22 and 24 to preserve the relative dimensions between the components of the transducer assembly 16 in different temperature environments. In the preferred embodiment the slider is molded from a block of barium titanate ceramic. The slider 20 is disc shaped and has a bottom media contacting surface 26 and a top surface 28. An elongated slot 30 extends between the surfaces 26 and 28 forming end walls indicated by the numerals 32 in FIGS. 4 and 5, and serves to receive a read/write core as will be subsequently described. A trough-shaped recess 34 is formed in the upper surface of slider 20 astraddle the slot 30. As indicated in FIG. 6 the recess 34 has a generally V-shaped cross section formed by the inclined surfaces 36 and extends a length less than the length of the slot 30. In the preferred embodiment, the surfaces 36 are inclined at a 45° angle relative to the surface 26 and to a plane normal thereto. An erase core receiving slot 40 centered along a diameter normal to the slot 30 is also formed in the upper side of slider 20 and has a relatively shallow depth and terminates at its outermost extremities in end walls 42. The bottom surfaces 44 of slot 40 incline downwardly from end walls 42 to intersect slot 30.

As shown in FIG. 3, the intersection of slots 30 and 40 is enlarged to form a central rectangular aperture 48. In the preferred embodiment the surfaces 44 are inclined at a 15° angle relative to the surface 26 as shown in FIG. 6.

Referring now to FIGS. 7–9, a U-shaped read/write magnetic core 50 having upstanding pole pieces or legs 52 which form pole faces that are spaced slightly apart and bonded together with a high temperature glass to form a read/write gap 54 therebetween (see FIG. 9) is inserted into the slot 30. Next, as illustrated in FIG. 8, a pair of magnetic erase pole pieces 56 are inserted into the slots 40 to form a partial transducer assembly. As shown in FIG. 8 the pole piece 56 includes a tip portion 58 forming a pole face 60 and a surface 62 adjacent thereto and a tapered body portion 64 having wall engaging surfaces 66 and 68, a rod engaging surface 70 and an erase core receiving surface 72. A spacing shim 74 of nonmagnetic bonding material is bonded to the surface 62 and serves to form an erase gap 75. In the preferred embodiment the shim 74 is comprised of a layer, 2 mils thick, of silicon monoxide glass having a melting temperature of about 870°C. The wall engaging surfaces 66 and 68 are formed to abut the surfaces 44 and the wall 42, respectively, of the slot 40 and the rod engaging surface 70 is formed to be coplanar with the surface 36 of the recess 34.

A pair of elongated glass rods 76 having a length substantially less than the distance between the end walls 32 are placed on the respective surfaces 36 and 70, and against the sides of the legs 52 of the read/write core 50, also as shown in FIG. 8. The glass rods 76 are formed of a glass having a much lower melting temperature than the shims 74 and the glass forming the read/write gap 54. In the preferred embodiment the glass rods 76 have a melting temperature of about 570°C, and a strain temperature of about 342°C. Next, the partial transducer assembly is placed in a furnace and heated to the melting temperature of the glass rods 76, causing the glass to melt and to flow against the read/write core 50 (as shown by the dashed lines 78 in FIG. 8) and into the central aperture 48 and into the space 79 in slots 30 and 40 surrounding the read/write core 50 and the erase pole pieces 56. With the partial assembly still in the furnace, the temperature is gradually reduced to a temperature below the strain temperature of the glass 76 thereby bonding the erase pole pieces 56, the read/write core 50 and the slider 20 into an integral rigid transducer assembly as shown in FIG. 9.

After bonding, the assembly is removed from the furnace and a pair of read/write coils 80 are installed over the pole piece 52. Next, a magnetic sidebar 82 is placed against the upper side of the pole pieces 52 and tacked in place with quick setting anerobic adhesive, thus forming the core 50, coils 80 and sidebar 82 into the read/write transducer 22.

An erase core assembly 84 comprises a pair of coplanar base portions 86, a generally U-shaped portion 88 interconnecting the portions 86, and an erase coil 90 disposed around the portion 88. The portion 88 includes a front face which lies in a plane disposed at an obtuse angle relative to the plane of the base portions 86. This geometry allows the erase core assembly 84 to be joined to the erase pole pieces 56 without contacting the read/write core 50.

In the next operation, the base portions 86 are placed on the respective erase core receiving surfaces 72 and bonded thereto with a quick setting anerobic adhesive, thereby forming the erase pole pieces 56 and the erase core assembly into the erase transducer 24. Although not shown, it should be noted that a clip is used to clamp the portions 86 to the surfaces 72 until the adhesive sets.

In the preferred embodiment, the magnetic material comprising the read/write core 80, sidebar 82, erase pole pieces 56 and erase core assembly 84 is a nickel zinc ferrite, and the anerobic adhesive is methyl cyanoacrylate epoxy.

With reference also to FIG. 9, it should be recognized that the erase gaps 75 are formed at the edges of the read/write gap 54 and are aligned in a direction normal thereto. Hence, when the coil 90 is energized by a DC voltage source (not shown), the erase field is transverse to the field across the read/write gap 54 and serves to trim the edges of the read/write track.

As shown in FIGS. 10 and 11, the housing 18 includes a generally cylindrical body 92 open at one end 94 and closed at the other end by a generally frustoconical or tapered section 96 having a transducer assembly receiving central aperture 98 concentric with the body 92. The portion 99 of the outer periphery nearest the frustoconical section 96 is formed into an octagonal configuration. In addition, one side 101 of the remaining cylindrical body 92 is flattened for alignment purposes. In the preferred embodiment the housing 18 is formed of glass-filled nylon 66. The diameter of the aperture 98 is slightly larger than the diameter of the slider 20. Protruding inwardly from the walls of aperture 98 are three elongated ridges 100. The ridges 100 protrude into the aperture far enough to provide an interference fit with the outer periphery of the slider 20 to secure it in a centered position relative to the body 92. A terminal supporting block 102 is mounted in the body 92 and serves to hold four conductor lugs 104.

After the slider 20 is pressed into the aperture 98, epoxy is forced into the annular space 105 between the slider and the aperture walls to rigidly secure the transducer assembly to the housing 18. The lead wires (not shown) from the coils 80 and 90 are then connected to the lugs 102 to complete the assembly.

The next step in the process is to lap and polish a spherical shape on the media contacting surface 26, the pole faces 60 of the erase transducer 24 and the pole faces of the read/write transducer 22 with the apex of the sphere being at about the center of the slot 30. In this step a polishing apparatus such as is described in U.S. Pat. No. 3,863,395, Brown, is used to form the surface into the spherical configuration. It should be recognized that the geometry of the components within the slot 30 is such as to provide a continuous surface to facilitate lapping and polishing. The polished surface 26 is indicated by the dashed lines 106 in FIG. 10.

In order to summarize the method of manufacture of the above-described magnetic head assembly 10, reference is again made to FIG. 2. As noted by the first block, the first step is providing the circular ceramic slider 20 having a first elongated slot 30, a second slot 40 disposed orthogonally to the first slot and forming the central aperture 48 extending through the slider 20 at the intersection of the first and second slots, and a trough-shaped recess 34 as shown in FIGS. 3–6.

Next, as illustrated in FIG. 7, the read/write core 50 is inserted into the first slot 30 in the slider with the read/write gap 54 positioned within the central aperture 48. Then the pair of erase pole pieces 56 are inserted into the second slot 40, one on either side of the read/write core 50 with the ends of the erase pole pieces nearest the read/write gap extending into the central aperture 48 and being separated from the read/write core 50 to form first and second erase gaps 75. Glass rods 76 are placed in the trough-shaped recess 34 on the erase pole pieces 56 near the read/write gap 54 (see FIGS. 7 and 8).

The unit is then placed in a furnace and heated to the melting temperature of the glass rods, causing the glass to flow into the central aperture 48 and into the spaces between the read/write core and the erase pole pieces to bond the read/write core and the erase pole pieces to the slider as shown in FIG. 9.

The next step in the process is to install the read/write coils 80 and sidebar 82 on the read/write core and to epoxy those components together to form the read/write transducer 22 (see FIG. 7). Then the erase core assembly 84 is installed on the erase pole pieces 56 and epoxied thereto to form the erase transducer 24 (see FIG. 7).

After the read/write transducer 22 and the erase transducer 24 are formed, the slider 20 carrying the transducer assemblies is pressed into the central aperture 98 of the housing 18, its outer diameter being in an interference fit with the inner diameter of the central aperture. This operation is illustrated in FIGS. 10 and 11.

Finally, the bottom surface of the transducer assembly is lapped and polished into a spherical configuration shown by the dashed lines 106 in FIG. 10.

In operation, as a magnetic media (not shown) is moved over the read/write transducing gap 54 of the magnetic head assembly 10, information is either read by the head or written by the head in a manner well known to the art. The erase transducer 24 is energized during all write operations to trim the sides of the written path by providing an erase flux across the erase gaps 75 in a direction substantially perpendicular to the direction of the written path between the erase pole face 60 and the pole face of the read/write core 50. Thus, old information in this region is erased.

While the invention has been particularly shown and described with reference to a certain preferred embodiment, it will be understood by those skilled in the art that various alterations and modifications in form and detail may be made therein. Accordingly, it is intended that the following claims cover all such alterations and modifications as fall within the true spirit and scope of the invention.

What is claimed is:

1. A magnetic head assembly comprising:

a generally cylindrical housing having a tapered portion at one end thereof terminating in a circular aperture having an inner diameter;

a circular body forming a slider having an outer diameter slighly less than said inner diameter, a media engaging surface and an internal surface, said body further having a first elongated slot disposed along a first diameter and extending through said body, a second slot disposed along a second diameter normal to said first diameter and extending part way into said body from said internal surface and across said first slot, and a central aperture extending through said body at the intersection of said first and second slots, said body being disposed within said circular aperture and affixed to said housing;

first means forming a read/write transducer having a pair of read/write pole pieces separated to provide a read/write gap, said read/write pole pieces extending into said first slot to a point substantially flush with said media engaging surface, said read/write gap being positioned within said central aperture;

second means forming an erase transducer and including a pair of erase pole pieces disposed in said second slot, one on each side of said first slot, the ends of said erase pole pieces nearest said read/write pole piece extending into said central aperture to a point proximate said media engaging surface, said erase pole pieces being separated from said read/write pole pieces to form first and second erase gaps; and means bonding said slider, said read/write transducer and said erase transducer together.

2. A magnetic head assembly as recited in claim 1 and further comprising a glass shim bonded to each of said ends of said erase pole pieces and serving to separate said erase pole pieces from said read/write pole pieces.

3. A magnetic head assembly as recited in claim 2 wherein each said erase pole piece includes a pole tip extending from said erase pole piece through said central aperture to a point flush with said media engaging surface.

4. A magnetic head assembly as recited in claim 1 wherein said second slot is tapered in depth from a relatively shallow dimension proximate the perimeter of said body to a relatively deep dimension near said central aperture and said erase pole pieces are correspondingly tapered for disposition within said second slot.

5. A magnetic head assembly as recited in claim 1 wherein said body further includes a recess on the internal surface side of said body straddling said first slot for receiving a quantity of glass which when heated flows into said central aperture and into the spaces between said read/write and said erase transducers to form said means bonding said transducers to said slider.

6. A magnetic head assembly as recited in claim 1 wherein said housing includes a plurality of elongated ridges protruding inwardly from said central aperture a distance sufficient to provide an interference fit with the outer periphery of said body, said ridges serving to affix said housing to said body.

7. A magnetic head assembly as recited in claim 1 wherein said media engaging surface has a spherically convex configuration.

* * * * *